United States Patent [19]

Caviglia, III

[11] 4,186,458
[45] Feb. 5, 1980

[54] KNOCKDOWN BEEHIVE FRAME

[76] Inventor: James P. Caviglia, III, 17300 Ave. 324, Visalia, Calif. 93277

[21] Appl. No.: 900,614

[22] Filed: Apr. 27, 1978

[51] Int. Cl.² ............................................. A01K 47/02
[52] U.S. Cl. ............................................................ 6/10
[58] Field of Search ....................................... 6/2 R, 10

[56] References Cited
U.S. PATENT DOCUMENTS

| | | | |
|---|---|---|---|
| 3,806,969 | 4/1974 | Varama | 6/10 |
| 4,077,075 | 3/1978 | Schade | 6/10 |

FOREIGN PATENT DOCUMENTS

145502  2/1952  Australia ........................................ 6/10

Primary Examiner—Louis G. Mancene
Assistant Examiner—Robert P. Swiatek
Attorney, Agent, or Firm—Victor Sepulveda; Vergil L. Gerard

[57] ABSTRACT

Disclosed is a knockdown beehive frame suitable for molding from plastic. The frame has a top member, bottom member and a pair of side members, all of which are mated with releasable interlocking portions so they can be assembled into a completed frame and disassembled again, at will. The frame members have slots and wire holes for maintenance of a wax sheet within the frame in the usual manner.

16 Claims, 15 Drawing Figures

KNOCKDOWN BEEHIVE FRAME

BACKGROUND OF THE INVENTION

This invention relates to beehive frames and particularly to frames formed from plastic.

For many years beehive frames were formed of wood. Frequently the frames are not assembled at their point of manufacture but are left broken down into their main structural members for ease in storing and handling and then assembled at the site of their use. Once assembled, however, they cannot be effectively broken down again and damage to one structural member of the frame requires a complete new frame for replacement.

More recently, the use of plastic frames has gained acceptance because such frames have been found less susceptible to warping, wear and breakage. Plastic frames presently known have several disadvantages, however, which it is the purpose of this invention to overcome. First, the plastic frames presently known are not capable of being knocked down after assembly nor original handling in a knockdown condition and assembly at the site of use. That is, they cannot be assembled from their structural members at the job site nor disassembled after use for repair or cleaning. Furthermore, some plastic frames are not truly interchangable with wood frames. Most beekeeping equipment now has standardized dimensions so that the frames from one hive will readily fit the frames from another. Plastic frames which are not interchangable with standardized wooden frames therefore require specially constructed hives or at least hives filled entirely with plastic frames.

Finally, in order for plastic frames to be economically competitive with wood frames, they must be constructed in such a way as to minimize the material used and yet maintain sufficient strength.

It is, therefore, a major object of my invention to provide a knockdown type beehive frame.

It is another object to provide a beehive frame of the type described that can be molded from plastic and yet is interchangable with standardized wooden frames and boxes.

It is a further object of my invention to provide a beehive frame of the type described which is well suited to formation by plastic injection molding and minimizes the use of material while maintaining adequate strength.

It is yet another object of my invention to provide a beehive frame of the type described which provides greater ease in the assembly of wax sheets and wires than wood frames.

These and other objects and advantages of my invention will become more readily apparent from the following detailed description of a preferred embodiment thereof when read together with the accompanying drawings in which:

Figure 1:
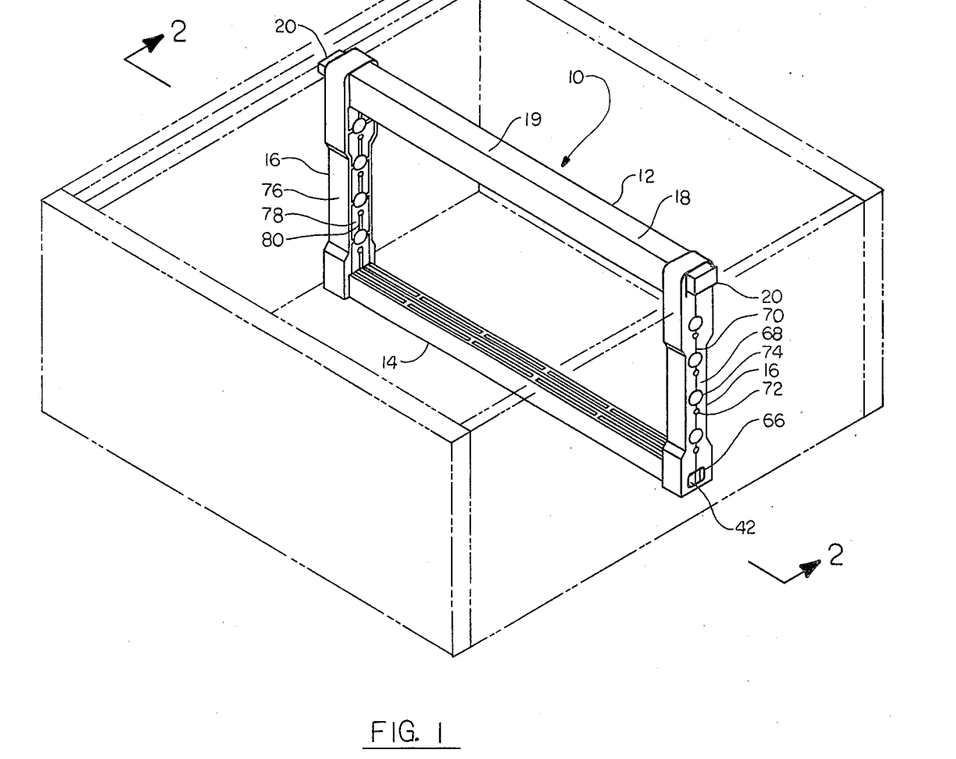
FIG. 1 is a perspective view of a preferred embodiment of my invention shown in its assembled condition in a box or super.
Figure 2:
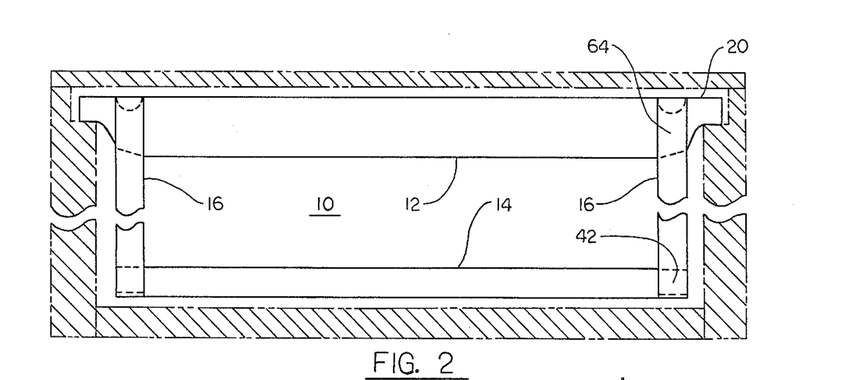
FIG. 2 is a broken side elevational view of my improved frame shown suspended in a box or super.
Figure 3:
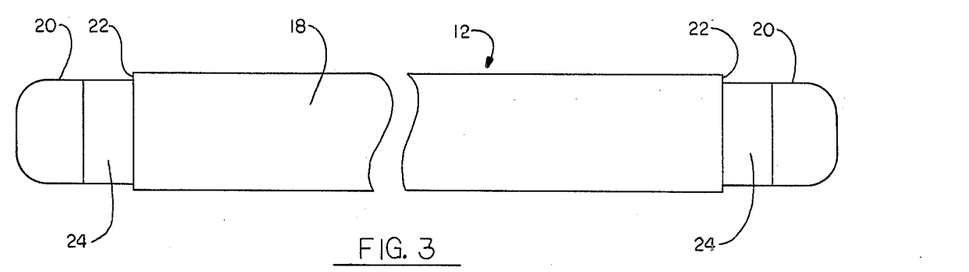
FIG. 3 is a top plan view of the top member of my preferred embodiment.
Figure 4:
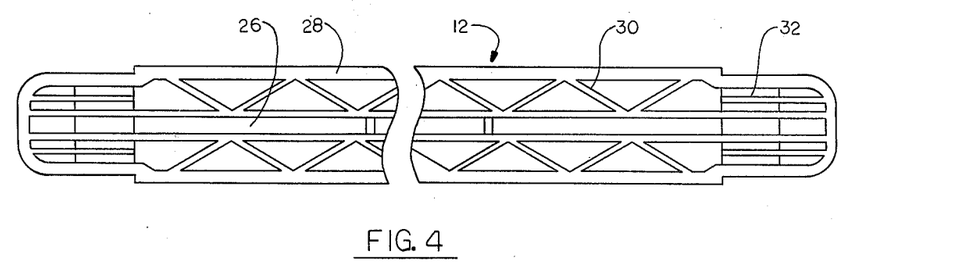
FIG. 4 is a bottom plan view of the top member of my preferred embodiment.

Referring now to the drawings and particularly FIGS. 1 and 2 thereof, the numeral 10 designates a preferred embodiment of my beehive frame suspended in a beehive box (shown in phantom). The frame 10 is formed of a top member 12, a bottom member 14 and a pair of side members 16. As best shown in FIGS. 3–6, the top member 12 has an elongated main body portion 18 with a planar upper surface 19, and with a pair of ears 20, one at each end. The ears 20 are of lesser width than the main body portion 18 so that a pair of shoulders 22 are formed on each side of the top member at the junction of each ear 20 with the main body portion. Laterally directed semi-circular grooves 24 are formed in each of the ears 20 adjacent their junction with the main body portion 18.

On its underside or bottom, the top member 12 has an elongated centrally disposed slot 26 which extends substantially the full length of the member, and planar side walls 28 of the same depth as the slot. Between the side walls 28 and the walls of slot 26 of the main body portion of the top member 12, a pattern of cross ribs 30 are formed which add structural support to the side walls, slot walls and top surface with a minimum of material. On the underside of the ears 20, structural support is provided by longitudinal ribs 32 formed between the side walls and the slot walls. The slot 26 has a width designed to receive a wax sheet and is tapered inwardly and upwardly to guide the sheet in the slot (see FIG. 6). Wedges (not shown) are used to secure the wax sheet in the slot in a manner well known in the art.

Figure 5:
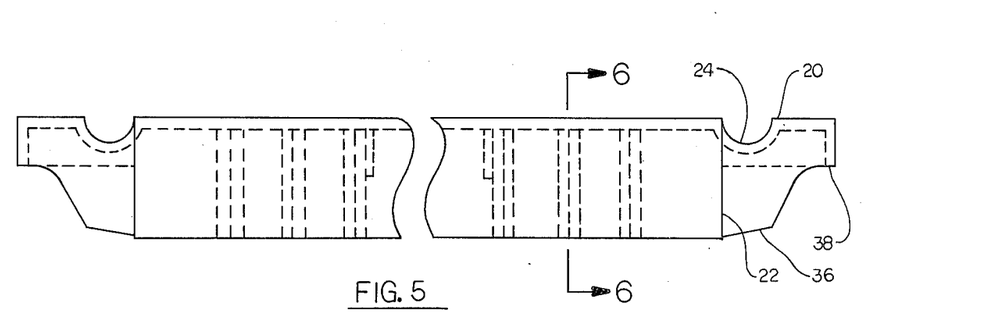
FIG. 5 is a side elevational view of the top member of my preferred embodiment.
Figure 6:
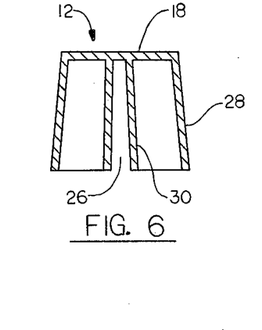
FIG. 6 is a sectional view at 6—6 in FIG. 5.

The sides of the ears 20 taper upwardly and outwardly from their junction with the main body portion 18 to provide a wedge surface 36 (see FIG. 5). Then the sides pass upwardly to the distal portion of the ears 20 and then directly outward to form a hanger surface 38.

The hanger surface 38 on the ears 20 rest on the sides of the beehive box or super to support the frames 10 in the box in the usual suspended condition.

Laterally directed grooves 24 are formed in the upper surface of the ears 20 which receive a rounded surface on the side members 16 upon assembly of the frame, as hereafter explained.

As best shown in FIGS. 9 through 12, the bottom member 14 of the frame 10 has an elongated main body portion 40 and a pair of forked ears 42, one at each end of the main body portion. The lower surface 43 of the main body portion 40 is planar and the upper portion has a slot 44 similar to the slot 26 in the top member 12 except that it is not tapered and slightly wider. The side walls 46 of the bottom member extend upwardly the same height as the slot 44 and cross braces 48 are formed between the side walls and the slot walls for increased structural support.

The forked ears 42 are laterally inset at their junctions with the main body portion 40 to provide a pair of side shoulders 50 at each end, and their side surfaces taper inwardly as they extend toward their distal ends to form a pair of guide surfaces 52. The space between the two prongs of the forked ears constitutes a receptacle 54 that receives and engages a finger on the side members upon assembly of the frame as hereafter more fully explained. The receptacle 54 has a pair of jaws at its distal portion formed by cleats 58 on the inner surfaces of the prongs.

A cross shoulder 60 is formed on the lower surface of the bottom member 14 in alignment with the side shoulders 50 to accommodate a portion of the side members 16 upon assembly of the frame as later explained.

Figure 13:
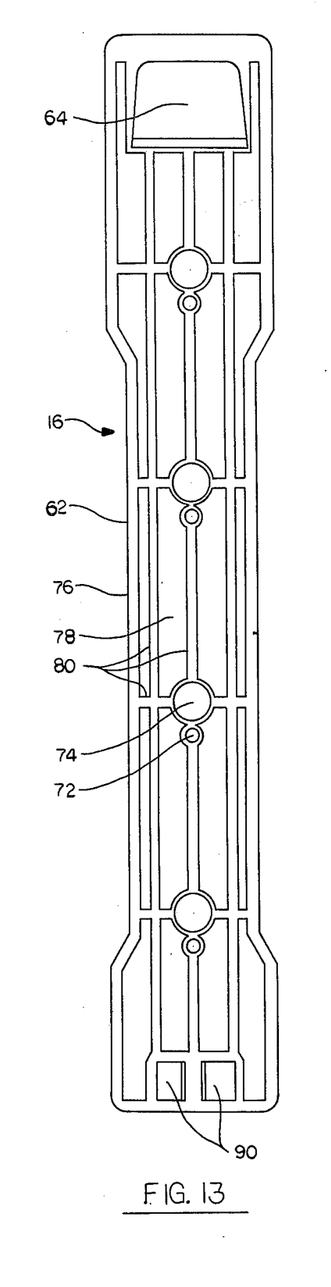
FIG. 13 is a side elevational view of the inside of the side member of my frame.
Figure 14:
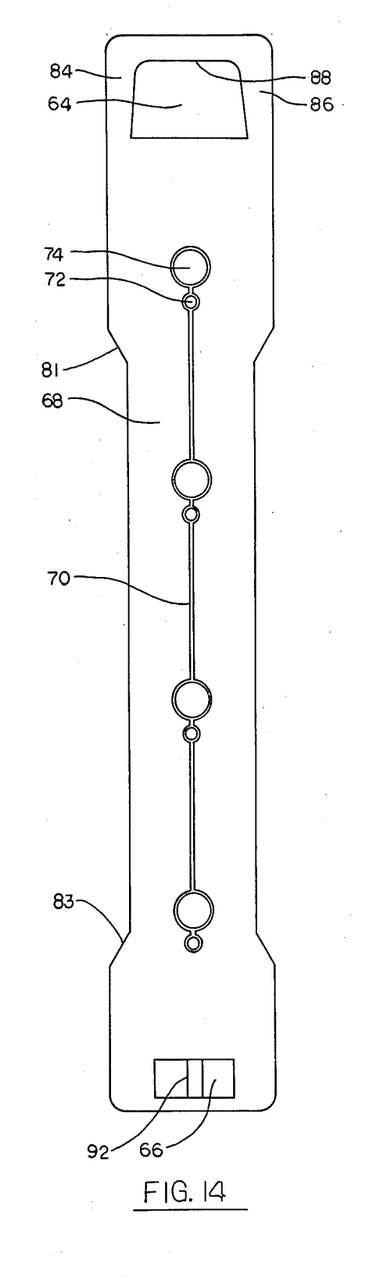
FIG. 14 is a side elevational view of the outside of the side member.
Figure 15:
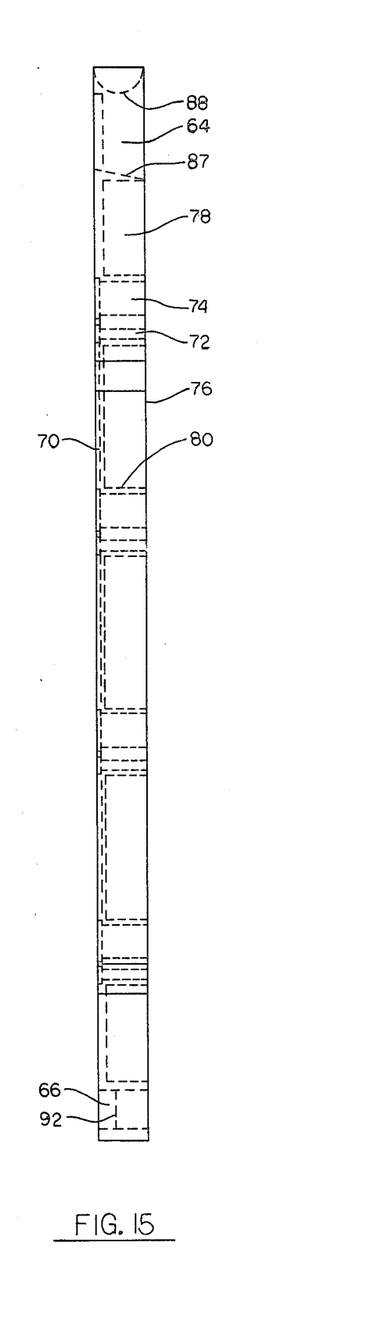
FIG. 15 is a side elevational view of one edge of the side member.

As shown in FIGS. 13-15, the side members 16 of the frame 10 each have an elongated main body portion 62 with a top receptacle 64 at the upper end and a bottom socket 66 at the lower end. The outside surface 68 of the side members 16 is planar and has a central longitudinal slit 70 extending over the major portion of its length. The slit 70 is periodically interrupted by equally spaced pairs of wire holes 72 and pin holes 74. The side members 16 have planar side walls 76 which extend normal to the outer surface 68 and form a cavity 78 on the inside of the side members. The cavity 78 is compartmentalized by lateral and longitudinal ribs 80, which extend inwardly to the same point as the side walls 76, to give structural strength to the side members with a minimum of material.

The wire holes 72 and pin holes 74 extend completely through the outer surface 68 and ribs 80 of the side members, while slit 70 is only a groove in the outer surface. The pin holes 74 are considerably bigger than the wire holes 72 and are adapted to receive support pins for the wax sheet as hereafter described. The wire holes 72 are used to thread wire across the frame opening for support of the wax sheet and the slits 70 are adapted to contain wire passing along the outer surface 68 of the side members from one wire hole or pin hole to the next.

The width of the side members 16 narrows about midway the length of the main body portion to form an upper neck 81 and expands again near the bottom to form a lower neck 83 so the central part is narrower than the upper and lower parts. This narrowing of the width provides a bee space between a group of assembled frames and the lower neck 83 expands the frame bottoms to prevent tilting in a manner well known in the art again.

The top receptacle 64 of the side members 16 is formed by a U-shaped frame 84 attached to the upper end of the main body portion 68. The cross-member of the U-shaped frame 84 is supported by the side legs 86 and has a semi-circular under surface 88 adapted to mate with the semicircular surface of the laterally directed grooves 24 in the top member 12. A ramp 87 is formed on the uppermost end of the main body portion 68 which tapers upwardly toward the outside to assist assembly between the top member 12 and side members 16 as later explained.

The bottom socket 66 on each of the side members 16 consists of a pair of windows 90 separated by a center post 92. The sides of the center post 92 are tapered to widen toward the outside. Widening of the sides of center post 92 provides a wedge for separating the forked ears of the bottom members as they are assembled with the lower ends of the side members, as later explained.

Assembly of the members to form the frames 10 is achieved as follows: the top member 12 is first assembled with the side members 16 inserting the ears 20 of each end of the top member into the receptacles 64 on the upper portions of the side members. To accomplish this assembly, the side members are oriented with their bottom portions spread apart so that an obtuse angle is formed between the top member and each side member. The bottom member 14 is then placed between the bottom portions of the side members with the forked ears 42 disposed in alignment with the bottom sockets 66. After the ears 20 are inserted into the receptacles 64 to the point where the rounded surface 88 fits into the laterally directed grooves 24, the bottoms of the side members are drawn together until the side members are in substantially right angular disposition with respect to the top member. This forces the wedge surface 36 on the ears 20 onto the ramp 87 in the lower portion of the side member receptacles 64 and, at the same time, drives the forked ears 42 into the bottom receptacles 66 where the forked ears are wedged apart by the tapered surfaces on the center post 92 until the center post pass into the receptacle 54 between the ears and is hooked by the cleats 58.

To disassemble the frame 10, the forked tongues 42 are disengaged from the center posts 92 by spreading the cleats 58, and forcing the forked tongues out of the bottom receptacles 66. Then the side members 16 are spread apart at their lower ends until the wedge surfaces 36 are freed from the ramps 87 and the ears 20 are drawn out of the receptacles 64.

Figure 7:
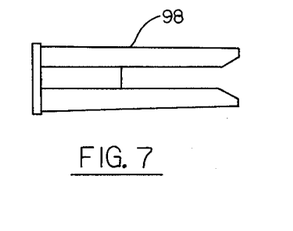
FIG. 7 is a side elevational view of a pin for supporting a wax sheet in my frame.
Figure 8:
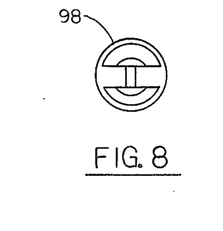
FIG. 8 is an end view of the pin shown in FIG. 7.
Figure 9:
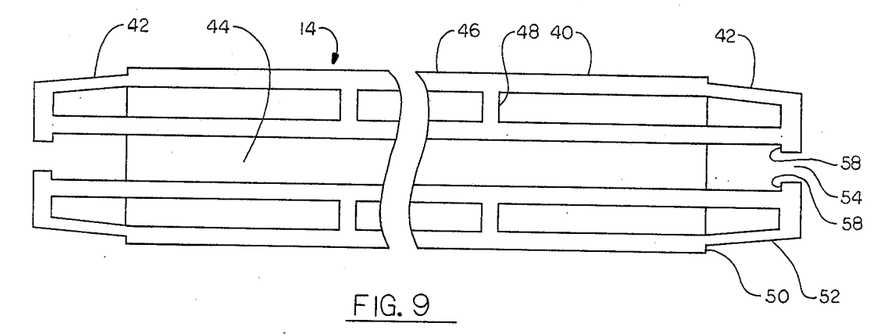
FIG. 9 is a top plan view of the bottom member of my frame.
Figure 10:
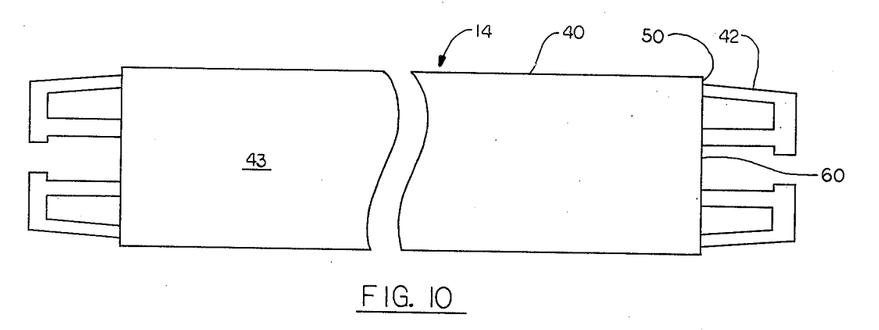
FIG. 10 is a bottom plan view of the bottom member.
Figure 11:
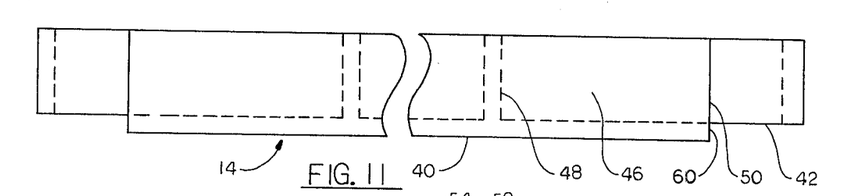
FIG. 11 is a side elevational view of the bottom member.
Figure 12:
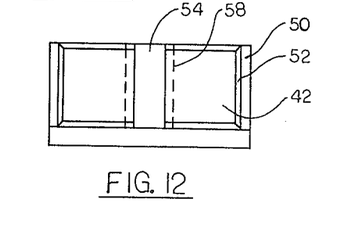
FIG. 12 is an end view of the bottom member.

A wax sheet can be mounted in the frame 10 in a number of ways known in the art. One way is to insert the top edge of the sheet into the tapered slot 26 and secure it there by forcing in several wedges. The sides and bottom of the wax sheet can then be worked into the center slots in the bottom member and side members. Support pins 98 as shown in FIG. 7 and 8 can then be pressed through the pin holes 74 in the side members 16 to provide additional support. Although the support pins 98 in this embodiment are formed of plastic, they could be made of wood or other suitable material, as well.

Another way to mount a wax sheet in my frame is to thread the frame with wire using the wire holes 72 or pin holes 74 and the slit 70. This technique is well known in the art, but it should be understood that my improved frame 10 not only has all the necessary facilities for wiring in a wax sheet, but the slit 70 permits the wire to extend along the outside of the frame side members without exposure to abrasion or other damage.

From this detailed description of a preferred embodiment it should be understood that I have provided an improved beehive frame that not only can be assembled in the field at a use site, but also can be readily disassembled to repair or replace a broken part, or for cleaning. Moreover, my improved frame is adapted to be formed from plastic by injection molding and minimizes the use of material to make it economically competitive with wood frames. Also, my frame incorporates all the facilities available in the best wood frames for mounting the wax sheets.

Accordingly, it should be understood that my improved beehive frame is fully capable of achieving the objects and providing the advantages heretofor attributed to it.

I claim:

1. An improved beehive frame comprising:

a plurality of frame members each having releasable interconnecting means disposed to engage and releasably interconnect with the interconnecting means on another of said members, said frame members being of sugh configuration as to form a rigid, generally rectangular frame when said members are interconnected by said interconnecting means, said releasable interconnecting means includes an ear having a proximal end attached to one end of said members and a distal end projected therefrom, said ear having a substantially planar top surface with a lateral directed semi-cylindrical groove formed therein, a contoured bottom surface which begins at the proximal end of said ear with a planar wedge surface disposed below said groove and slanted upwardly and outwardly with respect to said top surface and then passes upwardly and outwardly to form a hanger portion on the most extended end of said ear that passes outwardly parallel to said upper surface, and said releasable interlocking means further includes a tunnel shaped socket on another of said members having an open front and rear portion, said socket having an internal upper surface with a semi-cylindrical laterally directed projection formed therein of mating configuration with said laterally directed groove in the upper surface of said ear, and a ramp on the lower surface planar in configuration and sloped upwardly from the front to the rear portion of said socket to engage with said wedge surface of said ear and thereby force said ear upwardly in said socket to interlock said semi-circular projection into said semi-circular groove.

2. A beehive frame as described in claim 1, in which:
said frame members are formed in such configuration as to be readily extrudible from plastic.

3. A beehive frame as described in claim 1, in which:
said releasable interconnecting means include an ear projecting from one of said members and a socket formed in another of said members, said socket being of a configuration adapted to snugly receive said ear and a form of releasable interconnection therewith; and
said frame members are of such configuration as to be readily extrudible from plastic.

4. A beehive frame as described in claim 3, in which:
each of said frame members has an outer wall disposed to face outwardly with respect to said frame when said members are assembled into said rectangular frame, said outer wall has a substantially planar outer surface, a pair of side walls each attached to an opposite edge of said outer walls and extending inwardly therefrom substantially normal to said outer surface, a pair of elongated support walls longitudinally disposed on the inner surface of said outer wall and positioned centrally between and parallel to said side walls, and cross walls substantially normal to said outer wall and extending between said side walls and said support walls.

5. A beehive frame of the type described in claim 1, in which:
each of said members has a substantially planar outer surface disposed to face outwardly when said members are assembled into a rectangular frame as aforesaid, and a pair of elongated, longitudinally disposed, centrally located ribs formed on the inwardly directed side of said outer surface substantially normal thereto.

6. A beehive frame of the type described in claim 1, in which:
each of said frame members has an outer wall disposed to face outwardly with respect to said frame when said members are assembled into said rectangular frame, said outer wall has a substantially planar outer surface, a pair of side walls each attached to an opposite edge of said outer walls and extending inwardly therefrom substantially normal to said outer surface, a pair of elongated support walls longitudinally disposed on the inner surface of said outer wall and positioned centrally between and parallel to said side walls, and cross walls substantially normal to said outer wall and extending between said side walls and said support walls.

7. An improved beehive frame comprising:
a plurality of frame members each having releasable interconnecting means disposed to engage and releasably interconnect with the interconnecting means on another of said members, said frame members being of such configuration as to form a rigid, generally rectangular frame when said members are interconnected by said interconnecting means;
said releasable interlocking means includes a split ear on one of said members projecting therefrom in the form of two prongs disposed in spaced parallel relationship, said prongs being of such material and configuration as to be resiliently separable at their extended ends upon the manual application of separating force to increase the spacing therebetween and being resiliently returnable to their normal position upon withdrawal of said separating force, and said prongs each having a cleat projecting inwardly into the intervening space at their extended ends;
and said releasable interconnection means having a socket on another of said members disposed to receive said split ears, said socket having an open front end and rear end to provide a tunnel shape configuration and having a center post centrally interposed therein, said center post having a pair of planar side surfaces oppositely disposed and tapered to widen said center post from the front end toward the rear end of said socket, said surfaces being disposed to engage said cleats on said prongs of said split ear and wedge said prongs apart when said split ear is pressed into said socket until said cleats pass the rear of said center post whereupon the resiliency of said prongs snaps said cleats behind the rear of said center post and locks said split ear in said socket, and whereupon said split ear can be withdrawn from said socket by applying separating force to the extended ends of said prongs to separate said cleats a distance sufficient to permit the rear of said center post to pass therebetween.

8. An improved beehive frame comprising:
an elongated substantially rigid top member formed for horizontal disposition and having top member interconnector means on each end thereof;
an elongated substantially rigid bottom member formed for horizontal disposition and having bottom member interconnector means on each end thereof;

a pair of elongated substantially rigid side members formed for vertical disposition and having side to top interconnector means on their lower ends;

each of said top interconnectors on said top member being releasably interconnectable with a different one of said side to top interconnectors on said side members and each of said bottom interconnector means on said bottom member being releasably interconnectable with the side to bottom interconnectors on a different one of said side members, whereby said top member, said bottom member, and said side members are interconnectable into a rigid rectangular frame structure and permit knockdown of said frame structure into said individual members by release of said interconnections;

said top interconnector means includes an ear projecting from an end of said top member in longitudinal alignment therewith and having a reduced dimension defining a shoulder between said ear and said top member main body at the proximal end of said ear and means defining a hanger surface at the distal end of said ear disposed to rest upon a surface to support said top member in a generally horizontal position, and first-locking components; and said side to top interconnectors include receptacles for said ears, said receptacles having a leading portion and a trailing portion separated by a depth less than the longitudinal extension of said ears whereby when said ears are inserted in said receptacles with the leading portion of said receptacles engaging said shoulder at the proximal end of said ears, the distal end of said ears, and particularly said hanger surface, extends beyond the trailing portion of said receptacle, and second locking components interconnected with said receptacle and disposed to engage and interlock with said first locking components, said locking components being manually manipulable to release said interlock.

9. An improved beehive frame as described in claim 8, in which:

said locking components include a laterally directed tongue and groove disposed for interlocking engagement when said ear is inserted into said receptacle with said top member positioned at an obtuse angle with said side member and then swung into a right angle relationship with said side member.

10. An improved beehive frame of the type described in claim 8, in which:

said bottom interconnector means includes a forked ear extending longitudinally from an end of the main body of said bottom member to form a pair of generally parallel spaced, resiliently movable prongs with proximal ends affixed to the bottom member main body and distal ends extended outwardly therefrom and having inwardly directed cleats on said distal ends, and means defining a shoulder on the proximal ends of said forked ear at the interconnection between said forked ear and said bottom member main body; and said side to bottom interconnector means includes a receptacle having a leading edge and a trailing edge and disposed to receive said forked ear with the leading edge of said receptacle abutting said shoulder and the trailing edge of said receptacle being inward from the endmost portion of said ears, said receptacle having a center post disposed centrally thereof and positioned to align with the space between said forked ear prongs, said center post having sides tapered to widen from the leading edge to the trailing edge of said receptacle whereby upon insertion of said forked ear into said receptacle, said cleats on said distal ends of said prongs engage said tapered sides of said center post and are resiliently spread apart thereby to pass said center post into the space between said prongs, said prongs being of a length that said distal ends extend beyond said center post a distance equal to the depth of said cleats, whereby said cleats resiliently snap behind the trailing edge of said center post and lock said center post between said prongs when said forked ear is fully inserted in said receptacle to engage said shoulder with said receptacle leading edge, and said cleats release said center post from said space between said prongs and permit withdrawal of said forked ear from said receptacle when said distal ends are spread resiliently apart.

11. An improved beehive of the type described in claim 8, in which:

said bottom interconnector means includes a forked ear extending longitudinally from an end of the main body of said bottom member to form a pair of generally parallel spaced resiliently movable prongs with proximal ends affixed to the bottom member main body and distal ends extended outwardly therefrom and having inwardly directed cleats on said distal ends, and means defining a shoulder on the proximal ends of said forked ear at the interconnection between said forked ear and said bottom member main body; and said side to bottom interconnector means includes a receptacle having a leading edge and a trailing edge and disposed to receive said forked ear with the leading edge of said receptacle abutting said shoulder and the trailing edge of said receptacle being inward from the endmost portion of said ears, said receptacle having a center post disposed centrally thereof and positioned to align with the space between said forked ear prongs, said center post having sides tapered to widen from the leading edge to the trailing edge of said receptacle whereby upon insertion of said forked ear into said receptacle, said cleats on said distal ends of said prongs engage said tapered sides of said center post and are resiliently spread apart thereby to pass said center post into the space between said prong, said prongs being of a length that said distal ends extend beyond said center post a distance equal to the depth of said receptacle to engage said shoulder with said receptacle leading edge, and said cleats release said center post from said space between said prongs and permit withdrawal of said forked ear from said receptacle when said distal ends are spread resiliently apart.

12. An improved beehive frame comprising:

an elongated, substantially rigid top member adapted to be disposed in a horizontal position, said top member having a substantially planar upper surface, a pair of substantially planar side walls extending downward from the edges of said top surface and substantially normal thereto, means defining a centrally disposed slot in the lower portion of said top member and extending longitudinally therealong and having slot walls and spaced from said side walls, and a plurality of diagonally disposed bracing walls in between said side walls and said slot walls for structural support of said top member, said top member being so constructed as to be formable by plastic ejection molding;

an elongated substantially rigid bottom member adapted to be disposed in a horizontal position and having a planar bottom surface, a pair of substantially planar side walls extending upwardly from the edges of said bottom surface, and means defining a centrally disposed slot formed in the upper portion thereof and extending longitudinally therealong and having slot walls generally parallel to and inwardly disposed from said side walls, and said bottom member having cross walls formed between bottom member walls and said slot walls for structural support of said bottom member, said bottom member being so constructed as to be formable by plastic ejection molding;

an elongated and substantially rigid pair of side members adapted to be disposed in a vertical position, said side members each having a planar outside surface, a pair of planar side walls extending inwardly from each edge of said outside surface substantially normal thereto and having a necked down portion intermediate the ends thereof to provide top, bottom and side bee spaces when several of said frames are mounted in a beehive box, means defining a plurality of rib walls disposed with respect to said side member and formed on the inside of said outer surface and extending inwardly therefrom substantially normal to said outside surface, and cross members interposed between said side member sidewalls and said rib walls and disposed to cooperate with said rib walls to provide structural support to said side member, and said side member being so constructed as to be formable from plastic ejection molding;

side to top interconnection means for interconnecting said top member to said side members, said side to top interconnection means including ear and receptacle means formed on the upper end of said side members and the outer ends of said top member, having an ear with planar top and side surfaces and a bottom, a wedge surface and a hanger surface, a receptacle with a width less than the extension distance of said ear whereby said ear, when inserted in said receptacle projects from the trailing side thereof, said side to top interconnecting means being manually releasable and having tongue and groove lock means disposed to lock said ear in said receptacle when said top member is disposed at right angles to said side members and unlock said ear from said receptacle when the angular relationship between said top member and side members is increased to obtuse; and side to bottom interconnection means for interconnecting said bottom member to the lower ends of said side members, said side to bottom interconnecting means including ear and receptacle means formed on the lower end of said side members and the outer ends of said bottom members and having a forked ear with a pair of resilient prongs disposed in spaced parallel relationship and a receptacle with a center post aligned with the space between said prongs and having center post side walls which widen from their inner portion to their outer portion to form a wedge whereby said resilient prongs when forced into said receptacle pass over said center post side walls and are resiliently urged apart to pass said center post between said prongs, and said prongs resiliently snap together to lock said center post therebetween, and said prongs are manually separable to release said center post from said prongs to permit withdrawal of said forked ear from said receptacle.

13. An improved beehive frame as described in claim 12, in which:

each of said side members further includes a plurality of hole pairs opening through said outer surface and extending inwardly through said rib walls and cross members, each of said hole pairs having a pin hole of sufficient size to receive support pins for supporting a wax sheet disposed in said frame, and a wire hole smaller than said pin hole and of sufficient size to pass support wire for supporting a wax sheet in said frame, said hole pairs being disposed at spaced intervals along said side member intermediate the ends thereof, and a groove formed in said side member outer face and extending longitudinally therealong to interconnect the outermost ends of said hole pairs.

14. In a knockdown beehive frame formed with structural members extruded from plastic, releasable interconnecting means for interconnecting said structural members into a rectangular frame comprising:

side to top member connecting means including an ear projecting from an end to one of said members and having a planar top wall, a bottom surface defined by a pair of spaced, centrally disposed longitudinally directed support walls and a pair of planar spaced side walls all extending downwardly from said top wall, and receptacle means interconnected with one end of the other of said members, said receptacle means having a depth from its leading edge to its trailing edge of less than the longitudinal extension of said ear, whereby when said ear is inserted into said receptacle said ear passes completely through said receptacle and projects from the trailing edge thereof a distance sufficient to provide a support cleat for said top member and said frame; and side to bottom member connecting means including a split ear projecting from an end of one of said members and having a center slot therein, and a receptacle formed in the end of the other of said members, said receptacle having a pair of wedge surfaces with a lock shoulder disposed for engagement by said split ear when said split ear is inserted into said receptacle, whereby said split ear is resiliently deflected to snap said split ear in engagement with said lock shoulders when said split ear is inserted into said receptacle, and said split ear is resiliently deflectable manually to permit release from said lock shoulders upon withdrawal of said split ear from said receptacle.

15. A beehive frame as described in claim 14, in which:

said side to top member connecting means further includes a laterally directed groove in the top surface of said ear, an upwardly and outwardly directed wedge surface defined by the bottom surface of said ear disposed below said groove, a laterally directed projection on the upper portion of said receptacle disposed to interlock with said groove when said ear and receptacle are assembled, and an upwardly and outwardly directed ramp on the lower portion of said receptacle disposed to engage said wedge surface on said ear and force said projection into said groove when said ear is inserted into said receptacle with said members at an obtuse angle and said members are then moved to a right angular relationship, and shoulder means provided at the base of said ear and disposed to engage the periphery of said receptacle, when said members are so assembled.

16. A beehive frame as described in claim 14, in which:
said side to bottom connecting means includes cleats on the most extended ends of said split ear disposed to project into said center slot and a center post in said receptacle mounting said wedge surfaces and said lock shoulders.

* * * * *